US012323613B2

United States Patent
Sharman et al.

(10) Patent No.: US 12,323,613 B2
(45) Date of Patent: *Jun. 3, 2025

(54) VIDEO DATA ENCODING AND DECODING CIRCUITY APPLYING CONSTRAINT DATA

(71) Applicant: SONY GROUP CORPORATION, Tokyo (JP)

(72) Inventors: Karl James Sharman, Basingstoke (GB); Stephen Mark Keating, Basingstoke (GB); Adrian Richard Browne, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/458,725

(22) Filed: Aug. 30, 2023

(65) Prior Publication Data

US 2024/0064324 A1 Feb. 22, 2024

Related U.S. Application Data

(63) Continuation of application No. 16/897,703, filed on Jun. 10, 2020, now Pat. No. 11,770,549.

(51) Int. Cl.
*H04N 19/463* (2014.01)
*H04N 19/124* (2014.01)
*H04N 19/64* (2014.01)

(52) U.S. Cl.
CPC ......... *H04N 19/463* (2014.11); *H04N 19/124* (2014.11); *H04N 19/647* (2014.11)

(58) Field of Classification Search
CPC ... H04N 19/124; H04N 19/463; H04N 19/647
See application file for complete search history.

(56) References Cited

U.S. PATENT DOCUMENTS

| 2009/0219994 | A1* | 9/2009 | Tu ......................... H04N 19/186 375/E7.092 |
| 2013/0182755 | A1* | 7/2013 | Chen ..................... H04N 19/70 375/240.01 |

(Continued)

FOREIGN PATENT DOCUMENTS

CN 104054345 A 9/2014

OTHER PUBLICATIONS

Vivienne Sze, et al.; "High Efficiency Video Coding (HEVC)"; Algorithms and Architectures; Integrated Circuits and Systems; Aug. 24, 2014; 375 pgs.

(Continued)

*Primary Examiner* — Zhubing Ren
(74) *Attorney, Agent, or Firm* — Oblon, McClelland, Maier & Neustadt, L.L.P.

(57) ABSTRACT

Apparatus comprises video data decoder circuitry configured to decode an input video data stream, the video data decoder being responsive to parameter data associated with the input video data stream, the parameter data indicating a profile selected from a plurality of profiles, each profile defining a decoding attribute comprising one or more of a bit depth and a chrominance subsampling format; detector circuitry configured to detect constraint data associated with the input video data stream, the constraint data defining a difference between a decoding attribute applicable to the input video data stream and the decoding attribute defined by the profile indicated by the parameter data, in which the constraint data is configured to indicate a zero difference of the decoding attribute by a zero value of the constraint data; and control circuitry configured to control the video data decoder to decode the input video data stream to generate a decoded video data stream having a decoding attribute defined by the encoding profile provided by the parameter (Continued)

data, as modified by the difference defined by the constraint data.

18 Claims, 7 Drawing Sheets

(56) References Cited

U.S. PATENT DOCUMENTS

| | | | |
|---|---|---|---|
| 2013/0208792 A1 | 8/2013 | He et al. | |
| 2015/0016542 A1* | 1/2015 | Rosewarne | H04N 19/126 375/240.25 |
| 2015/0195545 A1 | 7/2015 | Wang et al. | |
| 2016/0191931 A1* | 6/2016 | Hannuksela | H04N 19/136 375/240.12 |
| 2020/0099942 A1 | 3/2020 | Tourapis et al. | |

OTHER PUBLICATIONS

Benjamin Bross, et al.; Versatile Video Coding (Draft 9); Document: JVET-R2001-vA; Joint Video Experts Team (JVET) of ITU-T SG 16 WP 3 and ISO/IEC JTC 1/SC 29/WG 11; 18$^{TH}$ Meeting By Teleconference; Apr. 15-24, 2020; 430 pgs.

Karl Ssharman, et al.; "AHG9: Profile-level Constraints on Chroma Format and Bit Depth Constraints Flags"; Document: JVET-S0094; Joint Video Experts Team (JVET) of ITU-T SG 16 WP 3 and ISO/IEC JTC 1/SC 29/WG11; 19$^{TH}$ Meeting by Teleconference; Jun. 22-Jul. 1, 2020; 3 pgs.

* cited by examiner

VIDEO DATA ENCODING AND DECODING
CIRCUITY APPLYING CONSTRAINT DATA

CROSS-REFERENCE TO RELATED
APPLICATION

This application is a continuation of and claims priority to U.S. patent application Ser. No. 16/897,703, filed on Jun. 10, 2020. The entire content of which is incorporated herein by reference.

BACKGROUND

Field

This disclosure relates to video data encoding and decoding.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

There are several systems, such as video or image data encoding and decoding systems which involve transforming video data into a frequency domain representation, quantising the frequency domain coefficients and then applying some form of entropy encoding to the quantised coefficients. This can achieve compression of the video data. A corresponding decoding or decompression technique is applied to recover a reconstructed version of the original video data.

Encoding and decoding functions are defined by so-called profiles, levels and tiers. Of these, the profile may define various attributes of the encoding and decoding functions such as (potentially amongst others) a chrominance subsampling format and a bit depth (or maximum bit depth) of the video or image data. Various other functions for use at the encoding and decoding operations (such as particular filtering operations) can also be defined by the profile. So-called constraints can be encoded in the bitstream (otherwise referred to as a data stream or a video data stream) to define variations from the attributes defined by a particular profile.

SUMMARY

The present disclosure addresses or mitigates problems arising from this processing.

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
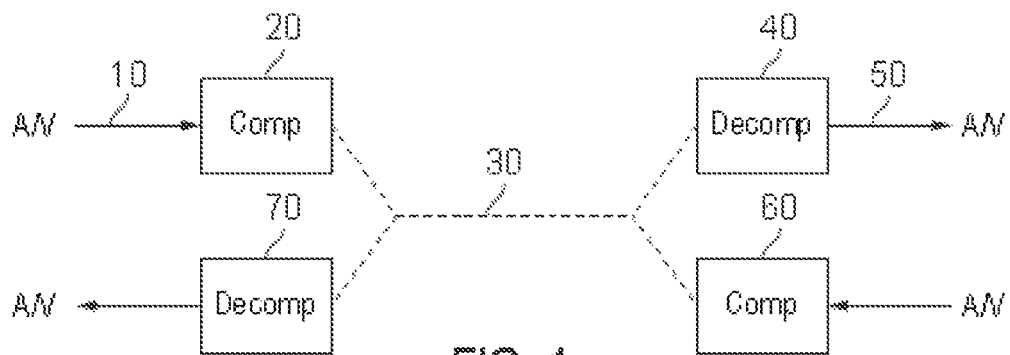
FIG. 1 schematically illustrates an audio/video (AN) data transmission and reception system using video data compression and decompression.

DESCRIPTION OF THE PREFERRED
EMBODIMENTS

Referring now to the drawings, FIGS. 1-4 are provided to give schematic illustrations of apparatus or systems making use of the compression and/or decompression apparatus to be described below in connection with embodiments of the present technology.

All of the data compression and/or decompression apparatus to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory data storage media by which such software and/or firmware are stored or otherwise provided, are considered as embodiments of the present technology.

FIG. 1 schematically illustrates an audio/video data transmission and reception system using video data compression and decompression. In this example, the data values to be encoded or decoded represent image data.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is unidirectional, only one of the nodes would require a compression apparatus and the other node would only require a decompression apparatus.

Figure 2:
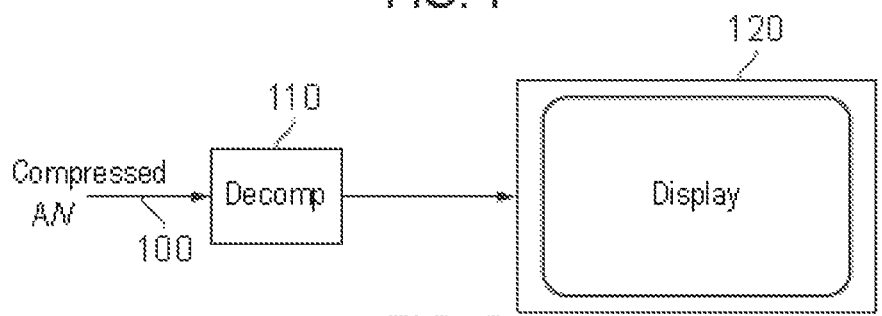
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 maybe provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
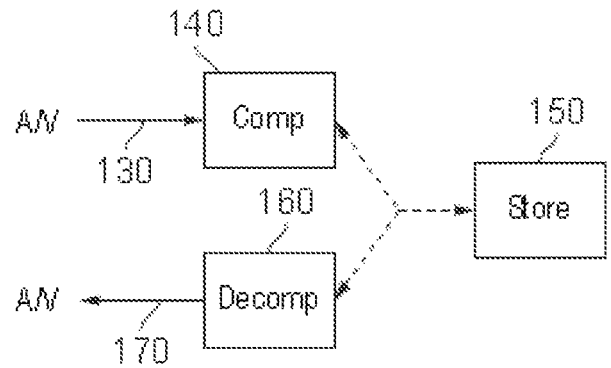
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the storage device 150 and passed to a decompression apparatus 160 for decompression to provide an output audio/video signal 170.

It will be appreciated that the compressed or encoded signal, and a storage medium such as a machine-readable non-transitory storage medium, storing that signal, are considered as embodiments of the present technology.

Figure 4:
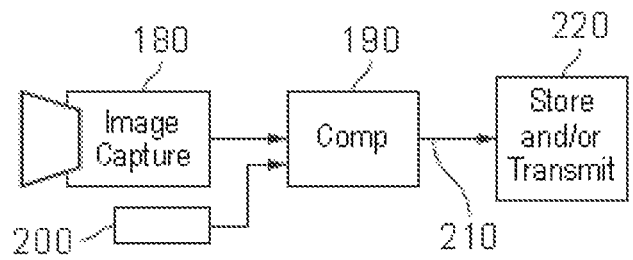
FIG. 4 schematically illustrates a video camera using video data compression.

FIG. 4 schematically illustrates a video camera using video data compression. In FIG. 4, an image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression and decompression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

FIG. 4 therefore provides an example of a video capture apparatus comprising an image sensor and an encoding apparatus of the type to be discussed below. FIG. 2 therefore provides an example of a decoding apparatus of the type to be discussed below and a display to which the decoded images are output.

A combination of FIGS. 2 and 4 may provide a video capture apparatus comprising an image sensor 180 and encoding apparatus 190, decoding apparatus 110 and a display 120 to which the decoded images are output.

Figure 5:
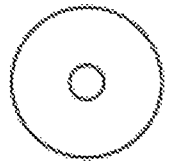
FIGS. 5 and 6 schematically illustrate storage media.
Figure 6:

FIGS. 5 and 6 schematically illustrate storage media, which store (for example) the compressed data generated by the apparatus 20, 60, the compressed data input to the apparatus 110 or the storage media or stages 150, 220. FIG. 5 schematically illustrates a disc storage medium such as a magnetic or optical disc, and FIG. 6 schematically illustrates a solid state storage medium such as a flash memory. Note that FIGS. 5 and 6 can also provide examples of non-transitory machine-readable storage media which store computer software which, when executed by a computer, causes the computer to carry out one or more of the methods to be discussed below.

Therefore, the above arrangements provide examples of video storage, capture, transmission or reception apparatuses embodying any of the present techniques.

Figure 7:
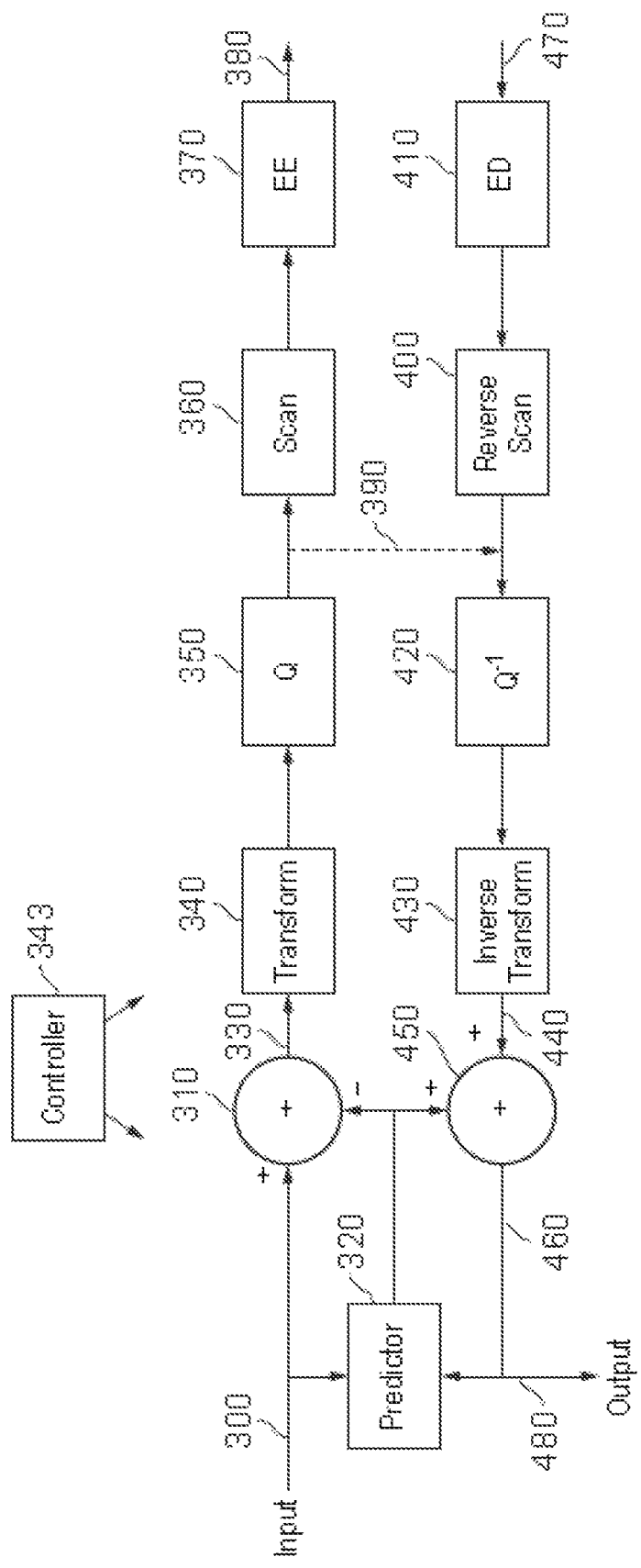
FIG. 7 provides a schematic overview of a video data compression and decompression apparatus.

FIG. 7 provides a schematic overview of a video or image data compression (encoding) and decompression (decoding) apparatus, for encoding and/or decoding video or image data representing one or more images.

A controller 343 controls the overall operation of the apparatus and, in particular when referring to a compression mode, controls a trial encoding processes by acting as a selector to select various modes of operation such as block sizes and shapes, and whether the video data is to be encoded losslessly or otherwise. The controller is considered to form part of the image encoder or image decoder (as the case may be). Successive images of an input video signal 300 are supplied to an adder 310 and to an image predictor 320. The image predictor 320 will be described below in more detail with reference to FIG. 8. The image encoder or decoder (as the case may be) plus the intra-image predictor of FIG. 8 may use features from the apparatus of FIG. 7. This does not mean that the image encoder or decoder necessarily requires every feature of FIG. 7 however.

The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and predicted images.

One reason why a residual image signal is generated is as follows. The data coding techniques to be described, that is to say the techniques which will be applied to the residual image signal, tend to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well such that the predicted image content is similar to the image content to be encoded, the expectation is that the residual image data will contain less information (less energy) than the input image and so will be easier to encode into a small amount of encoded data.

Therefore, encoding (using the adder 310) involves predicting an image region for an image to be encoded; and generating a residual image region dependent upon the difference between the predicted image region and a corresponding region of the image to be encoded. In connection with the techniques to be discussed below, the ordered array of data values comprises data values of a representation of the residual image region. Decoding involves predicting an image region for an image to be decoded; generating a residual image region indicative of differences between the predicted image region and a corresponding region of the image to be decoded; in which the ordered array of data values comprises data values of a representation of the residual image region; and combining the predicted image region and the residual image region.

The remainder of the apparatus acting as an encoder (to encode the residual or difference image) will now be described.

The residual image data 330 is supplied to a transform unit or circuitry 340 which generates a discrete cosine transform (DCT) representation of blocks or regions of the residual image data. The DCT technique itself is well known and will not be described in detail here. Note also that the use of DCT is only illustrative of one example arrangement. Other transforms which might be used include, for example, the discrete sine transform (DST). A transform could also comprise a sequence or cascade of individual transforms, such as an arrangement in which one transform is followed (whether directly or not) by another transform. The choice of transform may be determined explicitly and/or be dependent upon side information used to configure the encoder and decoder. In other examples a so-called "transform skip" mode can selectively be used in which no transform is applied.

Therefore, in examples, an encoding and/or decoding method comprises predicting an image region for an image to be encoded; and generating a residual image region dependent upon the difference between the predicted image region and a corresponding region of the image to be encoded; in which the ordered array of data values (to be discussed below) comprises data values of a representation of the residual image region.

The output of the transform unit 340, which is to say (in an example), a set of DCT coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process, to be described below, work more efficiently in generating small amounts of compressed video data.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a so-called up-right diagonal scanning order.

The scanning order can be different, as between transform-skip blocks and transform blocks (blocks which have undergone at least one spatial frequency transformation).

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC. Note that the scanning process and the entropy encoding process are shown as separate processes, but in fact can be combined or treated together. That is to say, the reading of data into the entropy encoder can take place in the scan order. Corresponding considerations apply to the respective inverse processes to be described below.

The output of the entropy encoder 370, along with additional data (mentioned above and/or discussed below), for example defining the manner in which the predictor 320 generated the predicted image, whether the compressed data was transformed or transform-skipped or the like, provides a compressed output video signal 380.

However, a return path 390 is also provided because the operation of the predictor 320 itself depends upon a decompressed version of the compressed output data.

The reason for this feature is as follows. At the appropriate stage in the decompression process (to be described below) a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered (in at least some examples) to be "lossless", which is to say that it can be reversed to arrive at exactly the same data which was first supplied to the entropy encoder 370. So, in such examples the return path can be implemented before the entropy encoding stage. Indeed, the scanning process carried out by the scan unit 360 is also considered lossless, so in the present embodiment the return path 390 is from the output of the quantiser 350 to the input of a complimentary inverse quantiser 420. In instances where loss or potential loss is introduced by a stage, that stage (and its inverse) may be included in the feedback loop formed by the return path. For example, the entropy encoding stage can at least in principle be made lossy, for example by techniques in which bits are encoded within parity information. In such an instance, the entropy encoding and decoding should form part of the feedback loop.

In general terms, an entropy decoder 410, the reverse scan unit 400, an inverse quantiser 420 and an inverse transform unit or circuitry 430 provide the respective inverse functions of the entropy encoder 370, the scan unit 360, the quantiser 350 and the transform unit 340. For now, the discussion will continue through the compression process; the process to decompress an input compressed video signal will be discussed separately below.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460 (although this may be subject to so-called loop filtering and/or other filtering before being output—see below). This forms one input to the image predictor 320, as will be described below.

Turning now to the decoding process applied to decompress a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. So, at the decoder side, the decoder reconstructs a version of the residual image and then applies this (by the adder 450) to the predicted version of the image (on a block by block basis) so as to decode each block. In straightforward terms, the output 460 of the adder 450 forms the output decompressed video signal 480 (subject to the filtering processes discussed below). In practice, further filtering may optionally be applied (for example, by a loop filter 565 shown in FIG. 8 but omitted from FIG. 7 for clarity of the higher level diagram of FIG. 7) before the signal is output.

Figure 8:
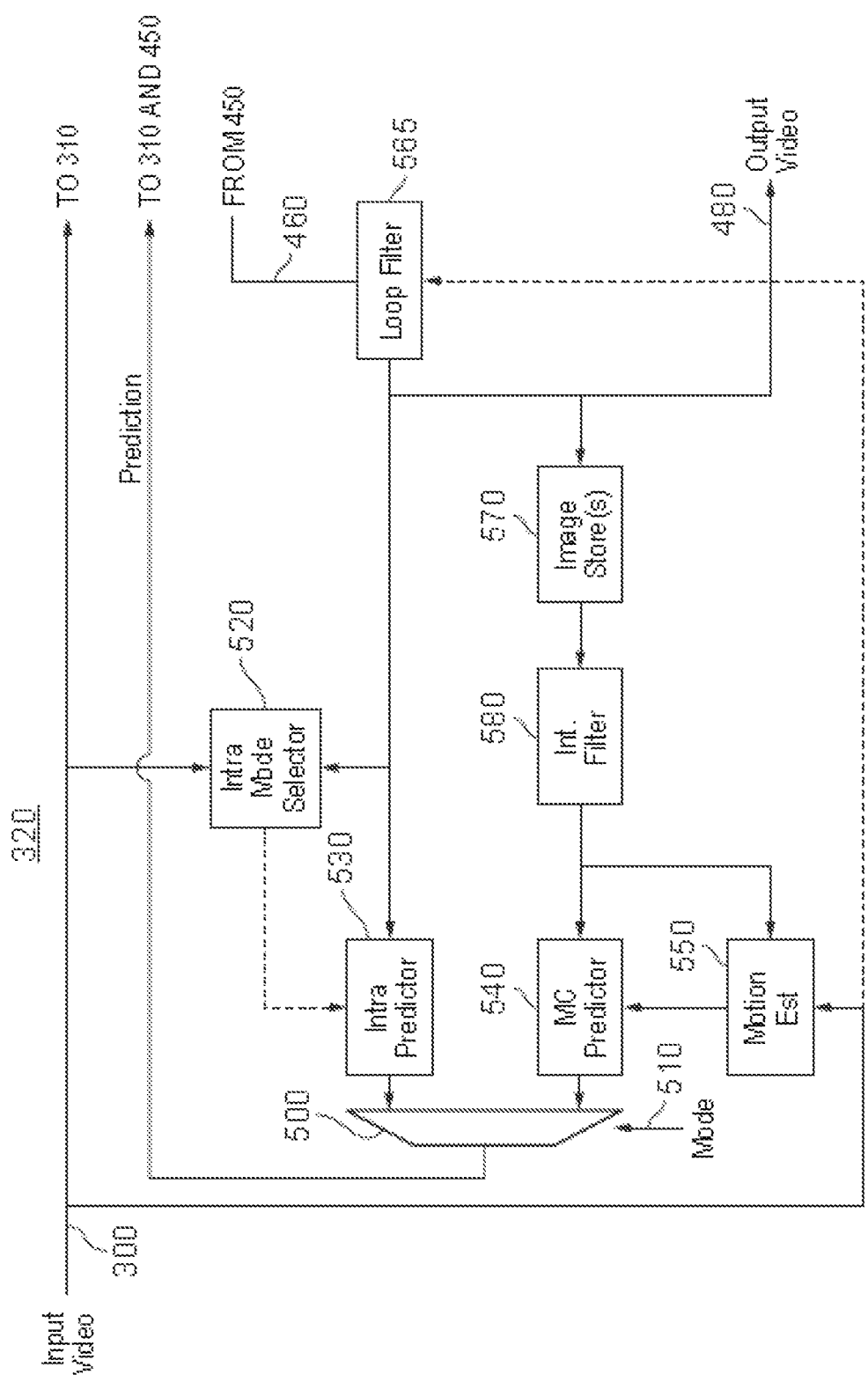
FIG. 8 schematically illustrates a predictor.

The apparatus of FIGS. 7 and 8 can act as a compression (encoding) apparatus or a decompression (decoding) apparatus. The functions of the two types of apparatus substantially overlap. The scan unit 360 and entropy encoder 370 are not used in a decompression mode, and the operation of the predictor 320 (which will be described in detail below) and other units follow mode and parameter information contained in the received compressed bit-stream rather than generating such information themselves.

FIG. 8 schematically illustrates the generation of predicted images, and in particular the operation of the image predictor 320.

There are two basic modes of prediction carried out by the image predictor 320: so-called intra-image prediction and so-called inter-image, or motion-compensated (MC), prediction. At the encoder side, each involves detecting a prediction direction in respect of a current block to be predicted, and generating a predicted block of samples according to other samples (in the same (intra) or another (inter) image). By virtue of the units 310 or 450, the difference between the predicted block and the actual block is encoded or applied so as to encode or decode the block respectively.

(At the decoder, or at the reverse decoding side of the encoder, the detection of a prediction direction may be in response to data associated with the encoded data by the encoder, indicating which direction was used at the encoder. Or the detection may be in response to the same factors as those on which the decision was made at the encoder).

Intra-image prediction bases a prediction of the content of a block or region of the image on data from within the same image. This corresponds to so-called I-frame encoding in other video compression techniques. In contrast to I-frame encoding, however, which involves encoding the whole image by intra-encoding, in the present embodiments the choice between intra- and inter-encoding can be made on a block-by-block basis, though in other embodiments the choice is still made on an image-by-image basis.

Motion-compensated prediction is an example of inter-image prediction and makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

A technique known as "block copy" prediction is in some respects a hybrid of the two, as it uses a vector to indicate a block of samples at a position displaced from the currently predicted block within the same image, which should be copied to form the currently predicted block.

Returning to FIG. 8, two image prediction arrangements (corresponding to intra- and inter-image prediction) are shown, the results of which are selected by a multiplexer 500 under the control of a mode signal 510 (for example, from the controller 343) so as to provide blocks of the predicted image for supply to the adders 310 and 450. The choice is made in dependence upon which selection gives the lowest "energy" (which, as discussed above, may be considered as information content requiring encoding), and the choice is signalled to the decoder within the encoded output datastream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area. In other examples, a trial encoding can be carried out for each selection or potential selection, with a choice then being made according to the cost of each potential selection in terms of one or both of the number of bits required for encoding and distortion to the picture.

The actual prediction, in the intra-encoding system, is made on the basis of image blocks received as part of the signal 460 (as filtered by loop filtering; see below), which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

Accordingly, the units 530 and 540 (operating with the estimator 550) each act as detectors to detect a prediction direction in respect of a current block to be predicted, and as a generator to generate a predicted block of samples (forming part of the prediction passed to the units 310 and 450) according to other samples defined by the prediction direction.

The processing applied to the signal 460 will now be described.

Firstly, the signal may be filtered by a so-called loop filter 565. Various types of loop filters may be used. One technique involves applying a "deblocking" filter to remove or at least tend to reduce the effects of the block-based processing carried out by the transform unit 340 and subsequent operations. A further technique involving applying a so-called sample adaptive offset (SAO) filter may also be used.

In general terms, in a sample adaptive offset filter, filter parameter data (derived at the encoder and communicated to the decoder) defines one or more offset amounts to be selectively combined with a given intermediate video sample (a sample of the signal 460) by the sample adaptive offset filter in dependence upon a value of: (i) the given intermediate video sample; or (ii) one or more intermediate video samples having a predetermined spatial relationship to the given intermediate video sample.

Also, an adaptive loop filter is optionally applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data-stream.

Techniques to be discussed below relate to the handling of parameter data relating to the operation of filters. The actual filtering operations (such as SAO filtering) may use otherwise known techniques.

The filtered output from the loop filter unit 565 in fact forms the output video signal 480 when the apparatus is operating as a decompression apparatus. It is also buffered in one or more image or frame stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images may be passed to an interpolation filter 580 which generates a higher resolution version of the stored images; in this example, intermediate samples (subsamples) are generated such that the resolution of the interpolated image is output by the interpolation filter 580 is 4 times (in each dimension) that of the images stored in the image stores 570 for the luminance channel of 4:2:0 and 8 times (in each dimension) that of the images stored in the image stores 570 for the chrominance channels of 4:2:0. The interpolated images are passed as an input to the motion estimator 550 and also to the motion compensated predictor 540.

The way in which an image is partitioned for compression processing will now be described. At a basic level, an image to be compressed is considered as an array of blocks or regions of samples. The splitting of an image into such blocks or regions can be carried out by a decision tree, such as that described in SERIES H: AUDIOVISUAL AND MULTIMEDIA SYSTEMS Infrastructure of audiovisual services—Coding of moving video High efficiency video coding Recommendation ITU-T H.265 12/2016. Also: High Efficiency Video Coding (HEVC) Algorithms and Architectures, chapter 3, Editors: Madhukar Budagavi, Gary J. Sullivan, Vivienne Sze; ISBN 978-3-319-06894-7; 2014 which are incorporated herein in their respective entireties by reference. Further background information is provided in "Versatile Video Coding (Draft 9)", JVET-R2001-vA, B. Bross, J. Chen, S. Liu and Y-K. Wang, which is also incorporated herein in its entirety by reference.

In some examples, the resulting blocks or regions have sizes and, in some cases, shapes which, by virtue of the decision tree, can generally follow the disposition of image features within the image. This in itself can allow for an improved encoding efficiency because samples representing or following similar image features would tend to be grouped together by such an arrangement. In some examples, square blocks or regions of different sizes (such as 4×4 samples up to, say, 64×64 or larger blocks) are available for selection. In other example arrangements, blocks or regions of different shapes such as rectangular blocks (for example, vertically or horizontally oriented) can be used. Other non-square and non-rectangular blocks are envisaged. The result of the division of the image into such blocks or regions is (in at least the present examples) that each sample of an image is allocated to one, and only one, such block or region.

Embodiments of the present disclosure, to be discussed below, concern techniques for representing encoding levels at the encoder and decoder.

Coding Tree Units (CTUs)

CTUs represent a basic processing unit of the apparatus discussed with reference to FIG. 7. They may also be referred to as largest coding units (LCUs). Typically a CTU can be between 16×16 pixels and 128×128 samples, with a larger size generally (though not exclusively, for example for smaller image sizes) providing increased coding efficiency.

CTUs may be subdivided using established techniques down to other units such as coding tree blocks (CTBs), coding units (CUs) (in which the CTU size is also the largest CU size), prediction units (PUs) and transform units (TUs).

Parameter Sets and Encoding Profiles, Levels and Constraints

When video data is encoded by the techniques discussed above for subsequent decoding, it is appropriate for the encoding side of the processing to communicate some parameters of the encoding process to the eventual decoding side of the processing. Given that these encoding parameters will be needed whenever the encoded video data is decoded, it is useful to associate the parameters with the encoded video data stream itself, for example (though not necessarily exclusively, as they could be sent "out of band" by a separate transmission channel) by embedding them in the encoded video data stream itself as so-called parameter sets.

Parameter sets may be represented as a hierarchy of information, for example as video parameter sets (VPS), sequence parameter sets (SPS) and picture parameter sets (PPS). The PPS would be expected to occur once each picture and to contain information relating to all encoded slices in that picture, the SPS less often (once per sequence of pictures) and the VPS less often still. Parameter sets which occur more often (such as the PPS) can be implemented as references to previously encoded instances of that parameter set to avoid the cost of re-encoding. Each encoded image slice references a single active PPS, SPS and VPS to provide information to be used in decoding that slice. In particular, each slice header may contain a PPS identifier to reference a PPS, which in turn references an SPS, which in turn references a VPS.

Another form of parameter information is the so-called decoding capability information (DCI), which is in fact a parameter set (though no longer by name), which indicates the maximum requirements that would ever pass along a particular data connection. This overall definition can be useful because video streams (VPS) may start and stop, but be butted up against each other. For example, a change of video channel being viewed via a particular broadcast or video on demand provider could switch the VPS, but actually no new connection need be made, or in an instance in which a live TV broadcast is interrupted by commercials, the interruption could be implemented by switching or concatenating VPSs.

The VPS gives information regarding a video sequence. This may be scalable, in which case there are multiple sequences within the video stream. If not scalable, then there would be only one sequence within the video stream. The SPS gives information regarding one of the sublayers of video—described as the sequence. Often then would only be one layer in the VPS, so there would only be one SPS. The PPS gives information regarding individual pictures.

Further examples include a so-called adaptive parameter set (APS), which is applicable to each slice, and is expected to contain information that varies more often than the other parameter sets.

With the exception of the APS, all are likely to be infrequently transmitted—but decoding cannot start until the required information has been sent. Hence for broadcast, with random entry into the stream (for example, a viewer can initiate decoding at any point in time), the information could be repeated, say, every 1 second.

The DCI, VPS and SPS may each contain sets of constraints of the form discussed below. The DCI must contain a set of these constraints, representing the worst case for the connection.

Amongst these parameter sets, the SPS contains example information relevant to some of the discussion below, namely data defining the so-called profile, tier and encoding level to be used.

The profile defines a set of decoding tools or functions to be used. Example profiles include the "Main Profile" relating to 4:2:0 video at 8 bits, and the "Main 10 Profile" allowing 10 bit resolution and other extensions with respect to the Main Profile.

In general terms, profiles, tiers and levels specify restrictions on encoded bitstreams. Indirectly they define the capabilities required to decode the bitstreams. A decoder operating to a particular profile, tier and level is required to be capable of decoding all instances of encoded bitstreams conforming to that profile, tier and level.

The decoding process is specified by the relevant standards and draft standards such that all decoders that conform to a specified profile and level (and operating with respect to a bitstream conforming to that profile and level) will generate a numerically identical output.

The profile may define a set of parameters, for example including a chrominance subsampling scheme (4:4:4, 4:2:2, 4:2:0 and the like).

So-called constraints may also be encoded. A constraint may refer to one of two categories of information:

a) a selective disabling of a particular feature of the encoder and decoder; in this context, constraints are generally taken to be subtractive, in that they either allow or switch off a feature which would otherwise be available within a particular profile. Examples of features which can be selectively disabled in this manner include the SAO (sample adaptive offset) filter, the ALF (adaptive loop filter), the use of multiple transforms such as DCT and DST, and a so-called palette mode.

Note in the so-called versatile video coding (VVC) arrangement, a constraint flag places a requirement on another flag. For example, the constraint no_alf_constraint_flag equal to 1 specifies that sps_alf_enabled_flag (which enables ALF) shall be equal to 0. The flag no_alf_constraint_flag equal to 0 does not impose such a constraint. In principle a full decoder need not pay any attention to the constraints if it can deal with each possible option. However, if there is a decoder that can only deal with some aspects, then it could (doesn't have to) check these flags. Also, if a profile (or sub-profile) is defined that requires some tools be turned off, a bit stream will not conform unless that constraint flag is set.

The constraint flags may also be present at a higher level, and represent multiple streams. They can also be used for scalable/layered coding, where they describe the constraints of the scalable streams that can represent a single scalable video stream. Hence they describe a maximum that is used, and then all bit depths and chroma formats of sub-sections of that stream are constrained to that maximum.

b) a selective variation of a particular parameter (which is to say that a default parameter associated with a profile can be changed to another value of that parameter; examples here include the chrominance subsampling format and the bit depth or maximum bit depth (which may actually in some examples be specified as "bit depth minus 8"). For example such constraints may define that encoder settings associated with (say) a 4:2:0 10 bit profile but in connection with 4:0:0 8 bit video data. These constraints may of course be defined individually and independently of other constraints where the technical context allows. The constraints can relate to differences between an encoding/decoding attribute applicable to a video data stream and the corresponding attribute defined by the profile indicated by the parameter data. Note here that "difference" does not necessarily imply a numerical or mathematical difference. In other words, defining a "difference between A and B" and representing it by constraint data indicates that A is not equal to B and the constraint data informs what that difference is, for example by mapping to a replacement value, rather than the constraint data providing a direct numerical indication of the replacement value.

Example embodiments concern constraints of the type (b) just described.

The encoding level provides restrictions on matters such as maximum sample rate and picture size. The tier imposes a maximum data rate.

In the JVET (Joint Video Experts Team) proposals for versatile video coding (VVC), such as those defined (at the filing date) by the specification JVET-R2001-vA referenced above, various levels are defined from 1 to 6.2.

Example Use of Parameter Sets

An example implementation will now be described with reference to the drawings.

Figure 9:
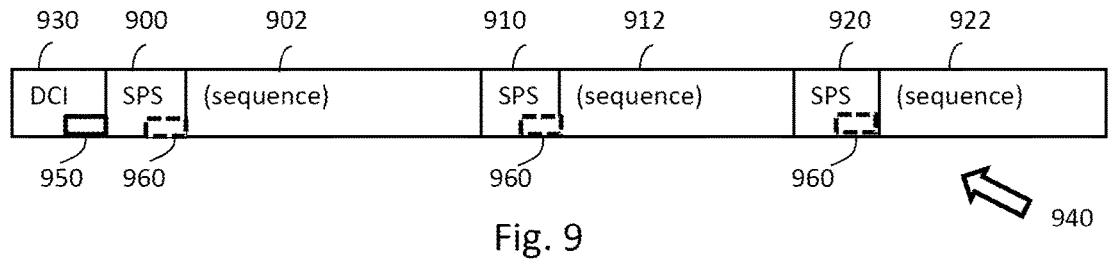
FIG. 9 schematically illustrates the use of parameter sets.

FIG. 9 schematically illustrates the use of video parameter sets and sequence parameter sets as discussed above. In particular, these form part of the hierarchy of parameter sets mentioned earlier such that multiple sequence parameter sets (SPS) 900, 910, 920 may reference an instance of decoding capability information (DCI) 930 and in turn be referenced themselves by respective sequences 902, 912, 922. In the example embodiments, profile information is defined in the DCI. So-called constraint flags or other forms of constraint data are provided in the DCI and optionally in the SPS, or alternatively (or in addition) by mechanisms which allow for scalable coding such as so-called video parameter sets (VPS). Level information applicable to the respective sequence may be provided in the sequence parameter sets. However, it will be appreciated that these information types could be provided in these and/or other parameter sets or locations with respect to the encoded bitstream.

However, in other embodiments it will be appreciated that the profile information could be provided in a different form or a different parameter set.

Note that the "profile" could in fact be defined by a hierarchy of profile information, for example as a profile and a sub-profile, with the net effect of the two (or more) instances being considered as effectively the "profile" applicable to a particular stream.

Similarly, although the schematic representation of FIG. 9 shows the DCI and sequence parameter sets being provided as part of the overall video data stream 940, the DCI and sequence parameter sets (or other data structure carrying the information under discussion here) could instead be provided by a separate communication channel. In either case, the profile information and constraints are associated with the video data stream 940.

FIG. 9 also provides schematic examples of data areas 950 within a DCI 930 which can carry at least profile information and/or constraint flags or other constraint data; and examples of data areas 960 within an SPS which can optionally carry at least constraint flags or other constraint data.

Example Operations—Decoder

Figure 10:
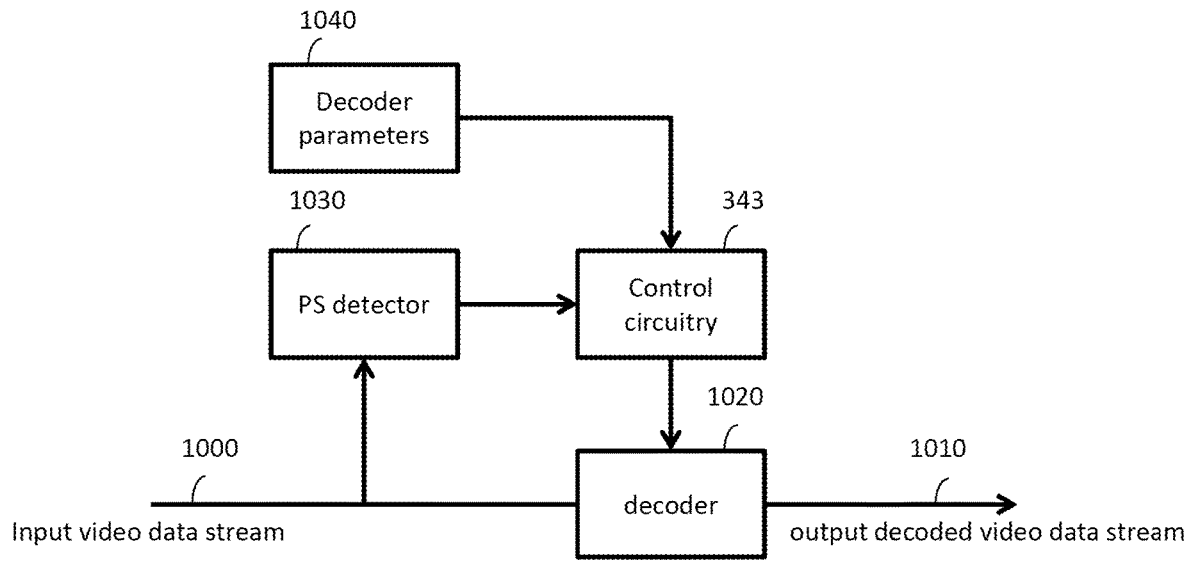
FIG. 10 schematically illustrates a decoding apparatus.

FIG. 10 schematically illustrates aspects of a decoding apparatus configured to receive an input (encoded) video data stream 1000 and to generate an output decoded video data stream 1010 using a decoder 1020 of the form discussed above with reference to FIG. 7. For clarity of the present explanation, the control circuitry or controller 343 of FIG. 7 is drawn separately to the remainder of the decoder 1020.

Within the functionality of the controller or control circuitry 343 is a parameter set (PS) detector 1030 which detects, from appropriate fields of the input video data stream 1000, the various parameter sets including one or more of the DCI, VPS, SPS and PPS. The parameter set detector 1030 derives information from the parameter sets including the level as discussed above. This information is passed to the remainder of the control circuitry 343. Note that the parameter set detector 1030 could decode the level or could simply provide the encoded level to the control circuitry 343 for decoding.

The control circuitry 343 is also responsive to one or more decoder parameters 1040 defining at least, for example, a level which the decoder 1020 is capable of decoding.

The control circuitry 343 detects whether or not, for the given or current input video data stream 1000, the decoder 1020 is capable of decoding that input videos data stream and controls the decoder 1020 accordingly. The control circuitry 343 can also provide various other operating parameters to the decoder 1020 in response to information obtained from the parameter sets detected by the parameter set detector 1030.

Therefore FIG. 10 provides an example of apparatus comprising:

video data decoder circuitry 1020 configured to decode an input video data stream, the video data decoder being responsive to parameter data associated with the input video data stream, the parameter data indicating a profile selected from a plurality of profiles, each profile defining a decoding attribute comprising one or more of a bit depth and a chrominance subsampling format;

detector circuitry 1030 configured to detect constraint data associated with the input video data stream, the constraint data defining a difference between a decoding attribute applicable to the input video data stream and the decoding attribute defined by the profile indicated by the parameter data; and control circuitry 343 configured to control the video data decoder to decode the input video data stream to generate a decoded video data stream having a decoding attribute defined by the encoding profile provided by the parameter data, as modified by the difference defined by the constraint data.

Example Operations—Encoder

Figure 11:
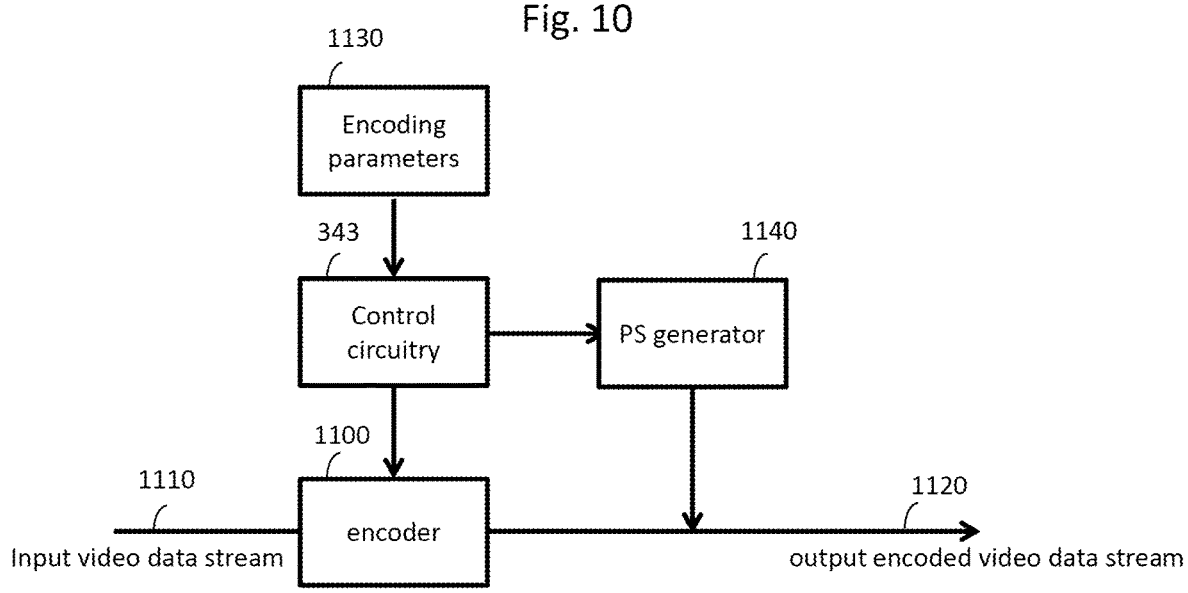
FIG. 11 schematically illustrates an encoding apparatus.

In a similar way, FIG. 11 schematically illustrates aspects of an encoding apparatus comprising an encoder 1100 of the type discussed above with reference to FIG. 7, for example. The control circuitry 343 of the encoder is drawn separately for clarity of the explanation. The encoder acts upon an input video data stream 1110 to generate and output encoded video data stream 1120 under the control of the control circuitry 343 which in turn is responsive to encoding parameters 1130 including a definition of an encoding profile and/or level to be applied.

Note that the parameters used at the encoder, provided by the schematic unit 1130 in FIG. 11, may be referred to as "encoding parameters" (as they are in FIG. 11) but they are also validly referred to as "decoding attributes" in the context of their transmission to the encoder, as they control both the encoding and the decoding processes.

The control circuitry 343 also includes or controls a parameter set generator 1140 which generates parameter sets including, for example, the DCI, VPS, SPS and PPS to be included within the output encoded video data stream.

Therefore FIG. 11 provides an example of apparatus comprising:

video data encoder circuitry 1100 configured to encode an input video data stream to generate an output encoded video data stream, the video data encoder being responsive to configuration data defining a decoding attribute comprising one or more of a bit depth and a chrominance subsampling format, the decoding attribute comprising one or more of a bit depth and a chrominance subsampling format; and parameter encoder circuitry 1140 configured to encode the decoding attribute to be associated with the output encoded video data stream in dependence upon the configuration data;

in which the parameter encoder circuitry is configured to encode parameter data indicating a profile selected from a plurality of profiles, each profile defining a decoding attribute, and constraint data defining a difference between the decoding attribute defined by the configuration data and the decoding attribute defined by the profile indicated by the parameter data, in which the constraint data is configured to indicate a zero difference of the decoding attribute by a zero value of the constraint data.

Encoding of Constraints

Figure 12:
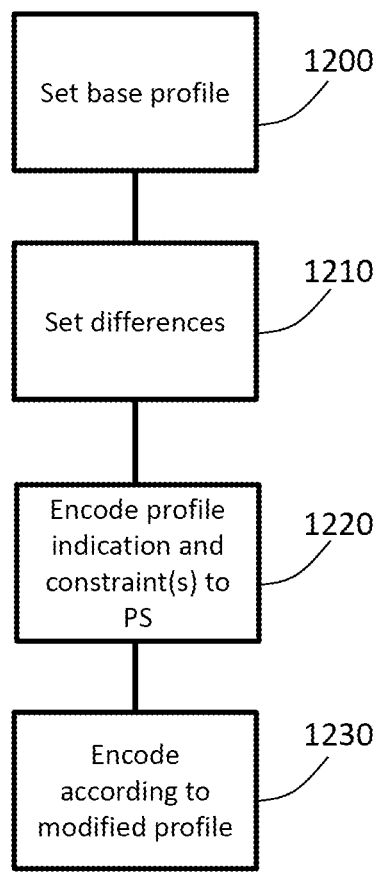
FIGS. 12, 13, 14, 15 and 16 are schematic flowcharts illustrating respective methods.
Figure 13:
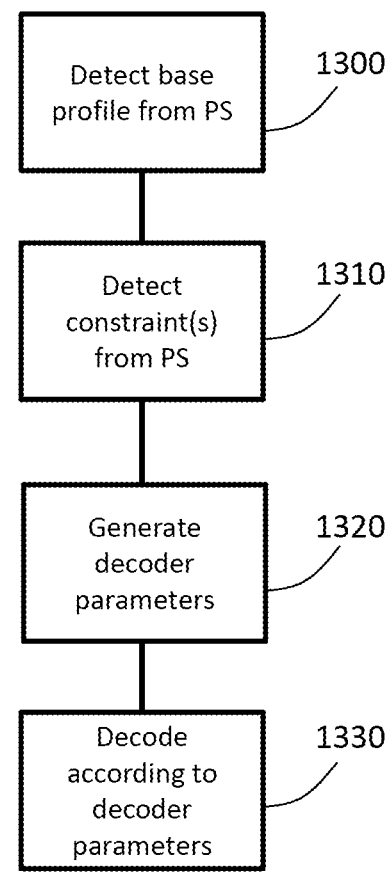

FIGS. 12 to 16 are schematic flowcharts defining respective methods, relating to various aspects of encoding and decoding constraints such as constraints of type (b) discussed above, although the general principles of the specific flowcharts of FIGS. 12 and 13 applied to constraints of the types (a) and (b). Subsequent drawings (FIGS. 14 to 16) will refer to constraints specifically of the type (b).

Referring to FIG. 12, at the encoder, a profile referred to in the diagram as a "base profile" is established as a fundamental configuration of the encoder at a step 1200. For example, the configuration may be defined by the unit 1130 of FIG. 11. Configuration data held by the unit 1130 also defines any differences from the base profile at a schematic step 1210. Note that the encoder may in fact operate exactly according to the base profile, in which case there are no differences to be noted at the step 1210. However, constraint flags or other constraint data indicating "no difference" are still used even in these circumstances.

At a step 1220, parameter data indicating the base profile and constraint data indicating whether or not there are differences from the base profile are encoded to one or more parameter sets such as the DCI and/or optionally the VPS and/or optionally the SPS. The generation of the parameter data and the constraint data may be performed by one or both of the control circuitry 343 and the parameter set generator 1140, with the parameter set generator 1140 attending to the encoding of the parameter data and constraint data to the encoded stream 1120.

Note that the constraint data is provided in a predetermined format which can be generated by the encoder and recognised by the decoder, for example as an ordered sequence of data fields with the order being established at both the encoder and the decoder. This implies that within the constraint data, labelling or identification of each of the data fields is not required because their respective meanings or functions are known to the decoder by their location relative to other data fields and/or a header field of the constraint data.

At a step 1230, the encoder 1100 encodes the required input video data stream to generate an output encoded video data stream under the control of the control circuitry 343 according to the base profile as modified by any variations defined by the constraint data.

FIG. 13 relates to corresponding operations at the decoder side. The decoder receives an input encoded video data stream and generates output decoded video data. The input stream may include parameter sets such as the DCI and/or the VPS and/or the SPS as discussed above.

At a step 1300, the decoder (in particular the parameter set detector 1030) detects the base profile defined by the parameter data in one or more of the parameter sets such as the DCI and/or the VPS and/or the SPS. At a step 1310, the decoder (again, the parameter set detector 1030) detects the constraint data comprising one or more constraint flags or other constraint information from a parameter set such as the DCI and/or the VPS and/or the SPS, the constraint data indicating any differences from the base profile.

At a step 1320, decoder parameters are generated by the parameter sets detector 1030 and/or the control circuitry 343 relating to the base profile as modified by any modifications defined by the constraint data, and at a step 1330, decoding is performed by the unit 1020 under the control of the control circuitry 343 according to the decoder parameters set at the step 1320.

Note that in FIGS. 12 and 13, the steps 1200, 1210, 1220 and the steps 1300, 1310, 1320 are shown as separate successive steps purely for schematic purposes and clarity of explanation but these groups of steps may be performed as single composite operations in a working embodiment.

Constraint Data Generation—Encoder

Figure 14:
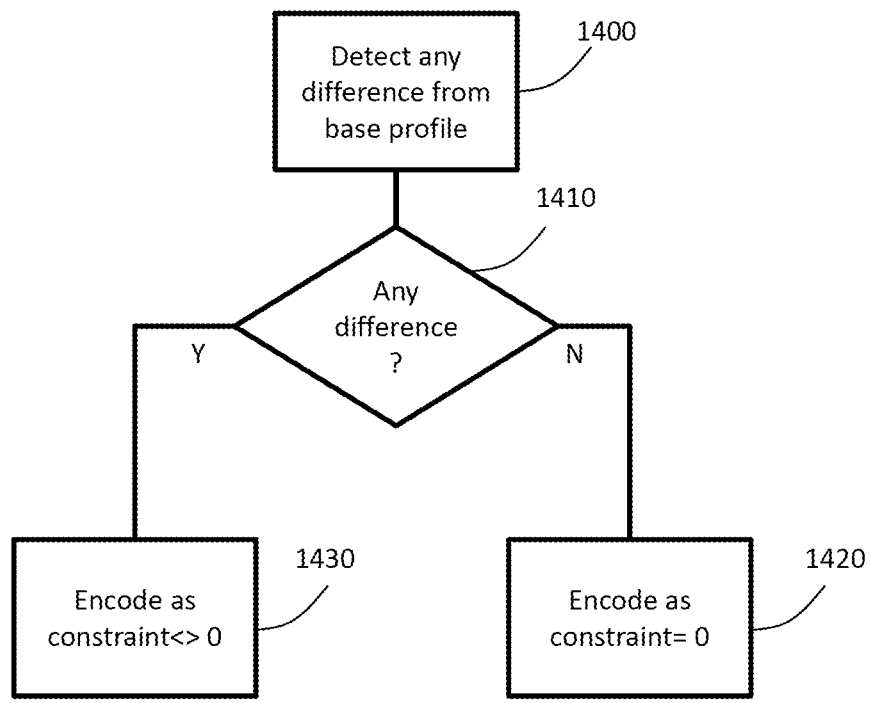
Figure 15:
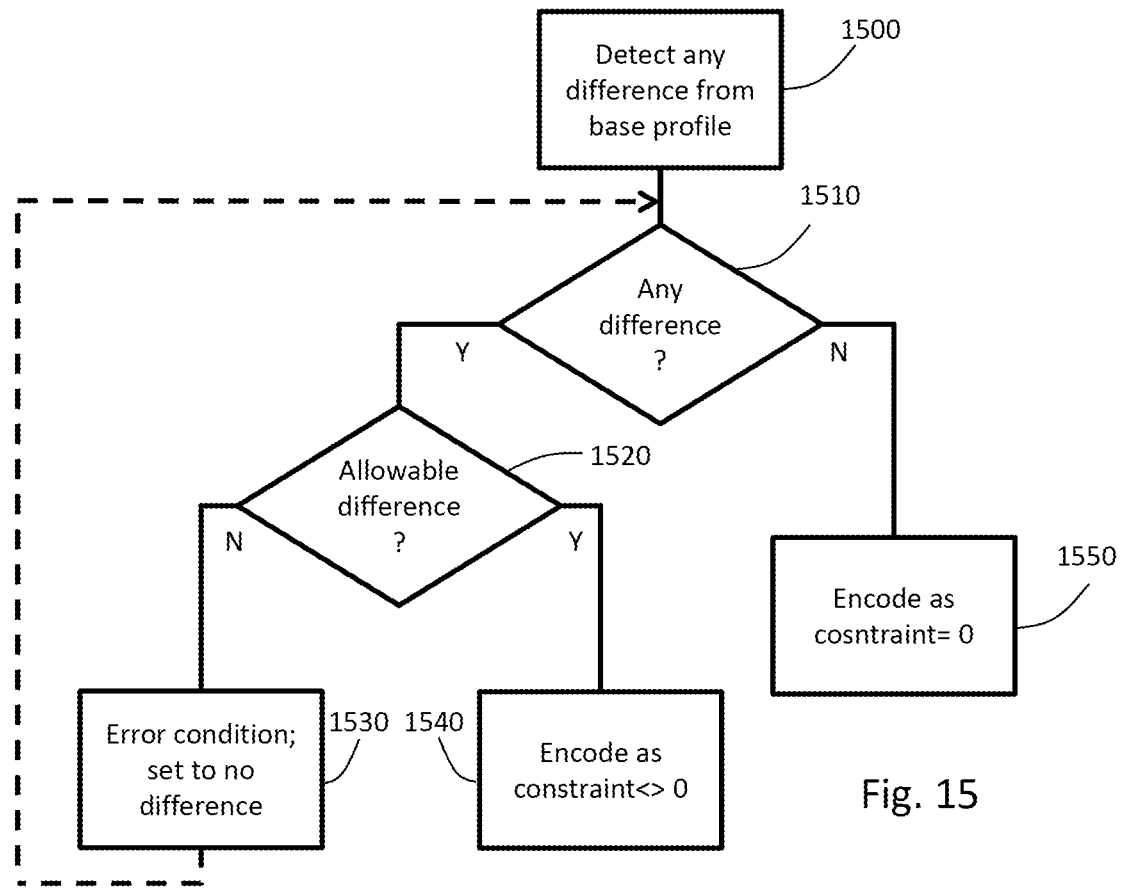

FIGS. 14 and 15 are schematic flowcharts relating to operations at the encoder side to generate constraint data of the type (b), which is to say operation is performed at the step 1220 discussed above. Either the flowchart of FIG. 14 or the flowchart of FIG. 15 may be followed, and the operations defined by the respective flowchart may be used in respect of each instance of constraint data of the type (b). For example, in a system in which the constraint data of the type (b) relates to each of a chrominance subsampling format and a bit depth or maximum bit depth (for example, being represented by a "maximum bit depth—8", the operations of either FIG. 14 or of FIG. 15 may be followed in respect of each of those two instances of constraint data of the type (b).

Referring first to FIG. 14, at a step 1400, any difference in respect of the parameter under consideration is detected with respect to the prevailing base profile. If, at a step 1410, there is no difference then control passes to a step 1420 at which the respective constraint is encoded as a constraint value of 0. If, however, there is a difference detected at the step 1410 then control passes to a step 1430 at which the respective constraint is encoded as another value, for example a value from a predetermined set of candidate constraint values in which each of the set is not equal to 0.

Potential advantages of using a value of 0 to indicate "no change from base profile" may include a relative ease of encoding zeroes to the encoded output data stream and/or a relative ease of a decoder detecting a block or group of zeroes in the constraint data indicating that no changes need to be implemented to the prevailing profile.

Therefore in examples, a mapping of a set of candidate values of the constraint data to respective difference amounts is used.

In other words, the constraint data is configured to indicate a zero difference of the decoding attribute by a zero value of the constraint data. Similarly, in the examples, the constraint data is configured to indicate a non-zero difference of the decoding attribute by a non-zero value of the constraint data.

Examples of the candidate constraint values and example mappings of those values to respective meanings are provided as follows.

(i) Chrominance subsampling format

| Data | Format |
|------|--------|
| 0 | no related additional constraint placed on from the base profile (which is to say "unconstrained") |
| 1 | 4:0:0 (monochrome) |
| 2 | 4:2:0 |
| 3 | 4:2:2 |

(ii) Bit depth (which may in fact be represented by "bit depth–8")

| Data | Bit depth |
|------|-----------|
| 0 | no related additional constraint placed on from the base profile (which is to say "unconstrained") |
| 1 | 8 bit |
| 2 | 9 bit |
| 3 | 10 bit |
| 4 | 11 bit |
| 5 | 12 bit |
| 6 | 13 bit |
| 7 | 14 bit |
| 8 | 15 bit |
| 9 | 16 bit |
| 10+ | currently undefined, but allows for future higher bit depth operation |

This range of possible values does not explicitly prohibit bad practice at an encoder, for example by not disallowing combinations of base profile and constraint data which, when combined, lead to modes of operation which are either not technically possible or at least not technically sensible, for example operating at a 4:2:0 10-bit base profile but with constraint data defining a bit depth of 16 bits. FIG. 15 addresses this potential issue. In FIG. 15, steps 1500, 1510, 1540 and 1550 corresponds to the respective steps 1400, 1410, 1430 and 1420 and will not be described further here. However, at the "yes" outcome of the step 1510, control schematically passes to a step 1520 at which the detected difference is tested to see whether it is an allowable difference.

Here, an allowable difference may be considered to be a "subtractive" difference so that the base profile is not enhanced in capability by the constraint data.

For example, when the decoding attribute is the bit depth, the respective difference amounts mapped to candidate values of the constraint data all represent negative differences in bit depth so that the bit depth defined by the encoding profile provided by the parameter data, as modified by the difference defined by the constraint data, is a bit depth no greater than the bit depth defined by the encoding profile provided by the parameter data.

As an example, when the base profile relates to (say) 10 bit data, the allowable values of the constraint for bit depth will be 0, 1 and 2. This restriction on the range of allowable values can potentially make the coding of the constraint more efficient.

In the context of chrominance subsampling format, the respective difference amounts mapped to candidate values of the constraint data all represent differences so that the chrominance subsampling format defined by the encoding profile provided by the parameter data, as modified by the difference defined by the constraint data, is a chrominance subsampling format no higher, in a predetermined hierarchy of chrominance subsampling formats, than the chrominance subsampling format defined by the encoding profile provided by the parameter data. For example, the predetermined hierarchy of chrominance subsampling formats may comprise, in an order from lower to higher in the predetermined hierarchy of chrominance subsampling formats:
  i. a 4:0:0 (monochrome) chrominance subsampling format;
  ii. a 4:2:0 chrominance subsampling format
  iii. a 4:2:2 chrominance subsampling format; and
  iv. a 4:4:4 chrominance subsampling format.

As an example, when the base profile relates to (say) a 4:2:0 subsampling format, the allowable constraint values according to this hierarchy will be 0 and 1. Again, this restriction on the range of allowable values can potentially make the coding of the constraint more efficient Assuming the outcome of the step 1520 is "yes", which is to say that the detected difference is an allowable difference for example as discussed above, then control passes to the step 1540 at which the difference is encoded by mapping to a constraint value not equal to 0. If, however, the outcome of the step 1520 is negative such that the detected difference is not an allowable difference then various outcomes could occur. One example is that a fatal error is triggered at the encoder side. Another example shown schematically in FIG. 15 is that an error condition is triggered but the handling of the error condition is such as not to cause a fatal error in encoder operation. Instead, the detected difference is set to a zero difference (such that the particular parameter in question operates according to its definition by the base profile) and control returns to the step 1510 which will then follow the "no" outcome to the step 1550. Also, referring back to FIG. 12, and noting that FIG. 15 represents an example of the operation of the step 1220, the encoding at the step 1230 will be performed on the basis of a zero difference in the parameter in question.

Therefore, FIG. 14 or 15, in combination with FIG. 12, provide an example of a method comprising:
  encoding 1230 an input video data stream to generate an output encoded video data stream, in response to configuration data defining a decoding attribute comprising one or more of a bit depth and a chrominance subsampling format, the decoding attribute comprising one or more of a bit depth and a chrominance subsampling format; and
  encoding 1220 (as further defined by either FIG. 14 or FIG. 15) the decoding attribute to be associated with the output encoded video data stream in dependence upon the configuration data, by encoding parameter data indicating a profile selected from a plurality of profiles, each profile defining a decoding attribute, and constraint data defining a difference between the decoding attribute defined by the configuration data and the decoding attribute defined by the profile indicated by the parameter data, in which the constraint data is configured to indicate a zero difference of the decoding attribute by a zero value of the constraint data.

In further examples relating to the operations defined by FIG. 15, the present disclosure provides a method comprising:
  encoding 1230 an input video data stream to generate an output encoded video data stream, in response to configuration data defining a decoding attribute comprising one or more of a bit depth and a chrominance subsampling format, the decoding attribute comprising one or more of a bit depth and a chrominance subsampling format; and
  encoding 1220, FIG. 15, the decoding attribute to be associated with the output encoded video data stream in dependence upon the configuration data, by encoding parameter data indicating a profile selected from a plurality of profiles, each profile defining a decoding attribute, and constraint data defining a difference between the decoding attribute defined by the configuration data and the decoding attribute defined by the profile indicated by the parameter data, in which the constraint data comprises a set of candidate constraint data values all of which relate to differences in the respective decoding attribute such that the the profile is not enhanced in capability by the difference defined by the constraint data.

The present disclosure also provides a corresponding apparatus of the type shown in FIG. 11 operating according to this method.

Constraint Data Detection—Decoder

Figure 16:
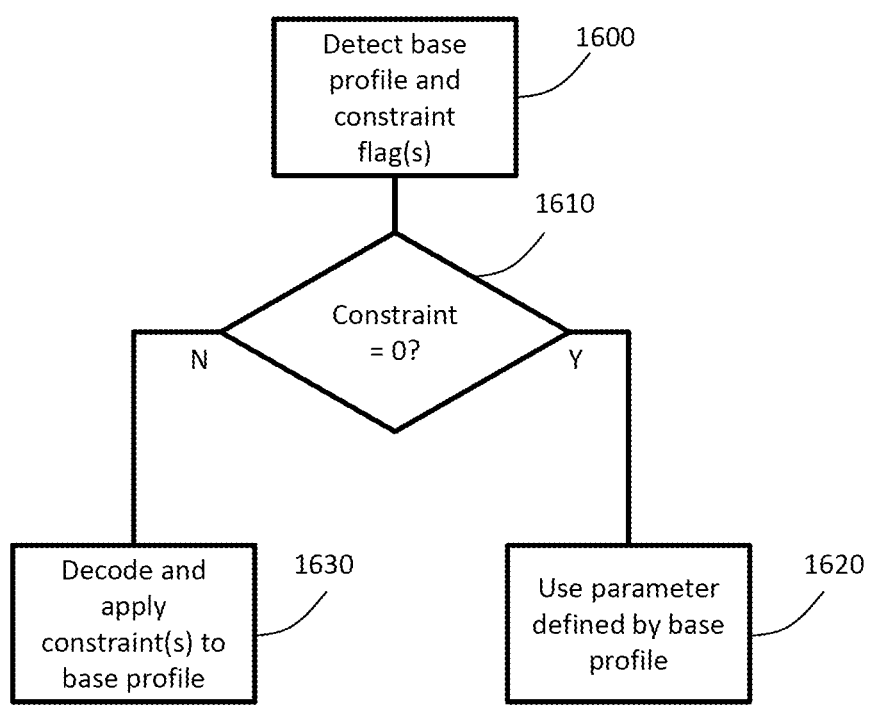

FIG. 16 provide an example of operations relating to the steps 1300 . . . 1320 of FIG. 13. Referring to FIG. 16, at the decoder side, at a step 1600 the base profile and constraints are detected, and for a given constraint of the type (b) a detection is made at a step 1610 as to whether the constraint is equal to 0. If the outcome is "yes" then control passes to a step 1620 at which the respective parameter is used according to its value defined by the base profile. If the outcome of the step 1610 is "no" then control passes to a step 1630 at which the constraint is decoded by applying an inverse mapping using for example the mapping information discussed above and the difference defined by the constraint is applied to the respective attribute or parameter defined by the base profile. Control then passes to the step 1330 of FIG. 13 for decoding according to the derived decoder parameters.

Therefore, FIG. 16, in combination with FIG. 13, provides an example of a method comprising:

decoding an input video data stream in response to parameter data associated with the input video data stream, the parameter data indicating a profile selected from a plurality of profiles, each profile defining a decoding attribute comprising one or more of a bit depth and a chrominance subsampling format;

detecting 1310, 1600 constraint data associated with the input video data stream, the constraint data defining a difference between a decoding attribute applicable to the input video data stream and the decoding attribute defined by the profile indicated by the parameter data, in which the constraint data is configured to indicate a zero difference of the decoding attribute by a zero value of the constraint data; and controlling 1320, 1620, 1630, 1330 the decoding step to generate a decoded video data stream having a decoding attribute defined by the encoding profile provided by the parameter data, as modified by the difference defined by the constraint data.

Naming Conventions

It will be appreciated that in the context of different video coding and decoding arrangements (such as standards, draft standards, ad-hoc standards, industry practices or the like), or even different generations or implementations of a particular arrangement, the naming conventions applied to different instances of configuration or parameter data can vary. Therefore, although the present disclosure and embodiments refer to "profiles", it will be appreciated that the use of this term does not imply a requirement for adherence to any specific arrangement (although example arrangements are referred to in the description given above) and that a data construct which provides the defined parameters (a decoding attribute comprising one or more of a bit depth and a chrominance subsampling format) is considered to represent an example of a "profile" even if, for the reasons given above or other reasons, it is not referred to as a "profile" in the relevant documentation defining that coding and decoding arrangement.

Encoded Video Data

Video data encoded by any of the techniques disclosed here is also considered to represent an embodiment of the present disclosure. A non-transitory machine-readable storage medium, such as one of the media shown schematically in FIGS. 5 and 6, which stores such video data, is also considered to represent an embodiment of the present disclosure.

SUMMARY

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Respective aspects and features are defined by the following numbered clauses:

1. Apparatus comprising:

video data decoder circuitry configured to decode an input video data stream, the video data decoder being responsive to parameter data associated with the input video data stream, the parameter data indicating a profile selected from a plurality of profiles, each profile defining a decoding attribute comprising one or more of a bit depth and a chrominance subsampling format;

detector circuitry configured to detect constraint data associated with the input video data stream, the constraint data defining a difference between a decoding attribute applicable to the input video data stream and the decoding attribute defined by the profile indicated by the parameter data, in which the constraint data is configured to indicate a zero difference of the decoding attribute by a zero value of the constraint data; and control circuitry configured to control the video data decoder to decode the input video data stream to generate a decoded video data stream having a decoding attribute defined by the encoding profile provided by the parameter data, as modified by the difference defined by the constraint data.

2. The apparatus of clause 1, in which the constraint data is configured to indicate a non-zero difference of the decoding attribute by a non-zero value of the constraint data.

3. The apparatus of clause 2, in which the detector circuitry is configured to generate the difference of the decoding attribute by mapping a set of candidate values of the constraint data to respective difference amounts.

4. The apparatus of clause 3, in which, when the decoding attribute is the bit depth, the respective difference amounts mapped to candidate values of the constraint data all represent negative differences in bit depth so that the bit depth defined by the encoding profile provided by the parameter data, as modified by the difference defined by the constraint data, is a bit depth no greater than the bit depth defined by the encoding profile provided by the parameter data.

5. The apparatus of clause 3 or clause 4, in which, when the decoding attribute is the chrominance subsampling format, the respective difference amounts mapped to candidate values of the constraint data all represent differences so that the chrominance subsampling format defined by the encoding profile provided by the parameter data, as modified by the difference defined by the constraint data, is a chrominance subsampling format no higher, in a predetermined hierarchy of chrominance subsampling formats, than the chrominance subsampling format defined by the encoding profile provided by the parameter data.

6. The apparatus of clause 5, in which the predetermined hierarchy of chrominance subsampling formats comprises, in an order from lower to higher in the predetermined hierarchy of chrominance subsampling formats:
   i. a 4:0:0 chrominance subsampling format;
   ii. a 4:2:0 chrominance subsampling format
   iii. a 4:2:2 chrominance subsampling format; and
   iv. a 4:4:4 chrominance subsampling format.

7. The apparatus of any one of the preceding clauses, in which:
   the input video data stream has associated parameter sets; and
   the video data decoder is configured to decode the parameter data from a parameter set and to decode the constraint data from a parameter set.

8. Video storage, capture, transmission or reception apparatus comprising apparatus according to any one of the preceding clauses.

9. Apparatus comprising:
   video data encoder circuitry configured to encode an input video data stream to generate an output encoded video data stream, the video data encoder being responsive to configuration data defining a decoding attribute comprising one or more of a bit depth and a chrominance subsampling format, the decoding attribute comprising one or more of a bit depth and a chrominance subsampling format; and
   parameter encoder circuitry configured to encode the decoding attribute to be associated with the output encoded video data stream in dependence upon the configuration data;
   in which the parameter encoder circuitry is configured to encode parameter data indicating a profile selected from a plurality of profiles, each profile defining a decoding attribute, and constraint data defining a difference between the decoding attribute defined by the configuration data and the decoding attribute defined by the profile indicated by the parameter data, in which the constraint data is configured to indicate a zero difference of the decoding attribute by a zero value of the constraint data.

10. The apparatus of clause 9, in which the constraint data is configured to indicate a non-zero difference of the decoding attribute by a non-zero value of the constraint data.

11. The apparatus of clause 10, in which the parameter encoder circuitry is configured to generate the difference of the decoding attribute by mapping a set of candidate values of the constraint data to respective difference amounts.

12. The apparatus of clause 11, in which, when the decoding attribute is the bit depth, the respective difference amounts mapped to candidate values of the constraint data all represent negative differences in bit depth so that the bit depth defined by the encoding profile provided by the parameter data, as modified by the difference defined by the constraint data, is a bit depth no greater than the bit depth defined by the encoding profile provided by the parameter data.

13. The apparatus of clause 11 or clause 12, in which, when the decoding attribute is the chrominance subsampling format, the respective difference amounts mapped to candidate values of the constraint data all represent differences so that the chrominance subsampling format defined by the encoding profile provided by the parameter data, as modified by the difference defined by the constraint data, is a chrominance subsampling format no higher, in a predetermined hierarchy of chrominance subsampling formats, than the chrominance subsampling format defined by the encoding profile provided by the parameter data.

14. The apparatus of clause 13, in which the predetermined hierarchy of chrominance subsampling formats comprises, in an order from lower to higher in the predetermined hierarchy of chrominance subsampling formats:
   i. a 4:0:0 chrominance subsampling format;
   ii. a 4:2:0 chrominance subsampling format
   iii. a 4:2:2 chrominance subsampling format; and
   iv. a 4:4:4 chrominance subsampling format.

15. The apparatus of any one of clauses 9 to 14, in which:
   the output encoded video data stream has associated parameter sets; and
   the parameter data encoder is configured to encode the parameter data to a parameter set and to encode the constraint data to a parameter set.

16. Video storage, capture, transmission or reception apparatus comprising apparatus according to any one of clauses 9 to 15.

17. A method comprising:
   decoding an input video data stream in response to parameter data associated with the input video data stream, the parameter data indicating a profile selected from a plurality of profiles, each profile defining a decoding attribute comprising one or more of a bit depth and a chrominance subsampling format;
   detecting constraint data associated with the input video data stream, the constraint data defining a difference between a decoding attribute applicable to the input video data stream and the decoding attribute defined by the profile indicated by the parameter data, in which the constraint data is configured to indicate a zero difference of the decoding attribute by a zero value of the constraint data; and
   controlling the decoding step to generate a decoded video data stream having a decoding attribute defined by the encoding profile provided by the parameter data, as modified by the difference defined by the constraint data.

18. Computer software which, when executed by a computer, causes the computer to carry out the method of clause 17.

19. A machine-readable non-transitory storage medium which stores the computer software of clause 18.

20. A method comprising:
    encoding an input video data stream to generate an output encoded video data stream, in response to configuration data defining a decoding attribute comprising one or more of a bit depth and a chrominance subsampling format, the decoding attribute comprising one or more of a bit depth and a chrominance subsampling format; and
    encoding the decoding attribute to be associated with the output encoded video data stream in dependence upon the configuration data, by encoding parameter data indicating a profile selected from a plurality of profiles, each profile defining a decoding attribute, and constraint data defining a difference between the decoding attribute defined by the configuration data and the decoding attribute defined by the profile indicated by the parameter data, in which the constraint data is configured to indicate a zero difference of the decoding attribute by a zero value of the constraint data.

21. An encoded video data stream generated by the method of clause 20.

22. A machine-readable non-transitory storage medium which stores the encoded video data stream of clause 21.

23. Computer software which, when executed by a computer, causes the computer to carry out the method of clause 20.

24. A machine-readable non-transitory storage medium which stores the computer software of clause 23.

The invention claimed is:

1. A video data decoder apparatus comprising:
   circuitry configured to:
   decode an input video data stream having one or more layers by the circuitry being configured to:
      obtain parameter data associated with the input video data stream, the parameter data indicating a profile selected from a plurality of profiles, each profile defining a decoding attribute comprising one or more of a bit depth and a chrominance subsampling format; and
      obtain constraint data associated with the input video data stream having one or more layers, the constraint data defining a difference between a second decoding attribute applicable to all layers of the input video data stream having one or more layers and the decoding attribute defined by the profile indicated by the parameter data,
   wherein the constraint data, when having value zero, does not impose a corresponding constraint, and
   when having a positive integer value in a predetermined range of values, the constraint data imposes a constraint on the one or more of the bit depth and the chrominance subsampling format indicated in the parameter data of the profile.

2. The video data decoder apparatus as claimed in claim 1, wherein the predetermined range of values for the constraint data for bit depth allows application for a bit depth of up to sixteen bits.

3. The video data decoder apparatus as claimed in claim 1, wherein the constraint data imposes a constraint on the bit depth to constrain the bit depth to a bit depth no greater than the bit depth defined by the decoding attribute of the profile.

4. The video data decoder apparatus as claimed in claim 1, wherein the constraint data imposes a constraint on the chrominance subsampling format to constrain the chrominance subsampling format to chrominance subsampling format no greater in a hierarchy of chrominance subsampling formats than the chrominance subsampling format defined by the decoding attribute of the profile.

5. The video data decoder apparatus as claimed in claim 1, wherein the input video data stream comprises, for another decoder feature, at least one first constraint flag in the constraint data and a corresponding first flag, wherein when the first constraint flag has the value one, the corresponding first flag has the value zero and when the first constraint flag has the value zero, no corresponding constraint is imposed.

6. The video data decoder apparatus as claimed in claim 5, wherein the constraint data for the each of the bit depth, the chrominance subsampling format and the at least one first constraint flag are commonly arranged such when having the value zero, no corresponding constraint is imposed.

7. The video data decoder apparatus as claimed in claim 1, wherein the constraint data for the bit depth and the chrominance subsampling format are each represented by more than one bit and the input video data stream comprises, for another decoder feature, at least one first constraint flag, the first constraint flag being a one bit flag and wherein no corresponding constraints are imposed when the more than one bit and the one bit flag each have a zero value.

8. The video data decoder apparatus as claimed in claim 1, wherein the value zero does not impose a corresponding constraint on the decoding attribute of the profile.

9. A video storage, capture, transmission or reception apparatus comprising the video data decoder apparatus of claim 1.

10. A video data decoding method comprising:
    decoding an input video data stream having one or more layers by:
    obtaining parameter data associated with the input video data stream, the parameter data indicating a profile selected from a plurality of profiles, each profile defining a decoding attribute comprising one or more of a bit depth and a chrominance subsampling format; and
    obtaining constraint data associated0 with the input video data stream having one or more layers, the constraint data defining a difference between a second decoding attribute applicable to all layers of the input video data stream having one or more layers and the decoding attribute defined by the profile indicated by the parameter data,
    wherein the constraint data when having value zero does not impose a corresponding constraint and when having a positive integer value in a predetermined range of values, the constraint data imposes a constraint on the one or more of the bit depth and the chrominance subsampling format indicated in the parameter data of the profile.

11. The video data decoding method as claimed in claim 10, wherein the predetermined range of values for the constraint data for bit depth allows application for a bit depth of up to sixteen bits.

12. The video data decoding method as claimed in claim 10, wherein the constraint data imposes a constraint on the bit depth to constrain the bit depth to a bit depth no greater than the bit depth defined by the decoding attribute of the profile.

13. The video data decoding method as claimed in claim 10, wherein the constraint data imposes a constraint on the chrominance subsampling format to constrain the chrominance subsampling format to chrominance subsampling format no greater in a hierarchy of chrominance subsampling formats than the chrominance subsampling format defined by the decoding attribute of the profile.

14. The video data decoding method as claimed in claim 10, wherein the input video data stream comprises, for another decoding feature, at least one first constraint flag in the constraint data and a corresponding first flag, wherein when the first constraint flag has value one, the corresponding first flag has the value zero and when the first constraint flag has the value zero, no corresponding constraint is imposed.

15. The video data decoding method as claimed in claim 14, wherein the constraint data for the each of the bit depth, the chrominance subsampling format and the at least one first constraint flag are commonly arranged such when having the value zero, no corresponding constraint is imposed.

16. The video data decoding method as claimed in claim 10, wherein the constraint data for the bit depth and the chrominance subsampling format are each represented by more than one bit and the input video data stream comprises, for another decoding feature, at least one first constraint flag, the first constraint flag being a one bit flag and wherein no corresponding constraints are imposed when the more than one bit and the one bit flag each have a zero value.

17. The video data decoding method as claimed in claim 10, wherein the value zero does not impose a corresponding constraint on the decoding attribute of the profile.

18. A non-transitory machine-readable storage medium which stores computer software which, when executed by a computer, causes the computer to carry out the method of claim 10.

* * * * *